United States Patent
Gaal et al.

(10) Patent No.: US 7,006,834 B2
(45) Date of Patent: Feb. 28, 2006

(54) BASE STATION TIME CALIBRATION USING POSITION MEASUREMENT DATA SENT BY MOBILE STATIONS DURING REGULAR POSITION LOCATION SESSIONS

(75) Inventors: Peter Gaal, San Diego, CA (US); Samir Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 621 days.

(21) Appl. No.: 10/034,941

(22) Filed: Dec. 21, 2001

(65) Prior Publication Data

US 2003/0119496 A1    Jun. 26, 2003

Related U.S. Application Data

(60) Provisional application No. 60/335,080, filed on Oct. 29, 2001.

(51) Int. Cl.
   *H04Q 7/20*    (2006.01)
(52) U.S. Cl. .................. 455/456.1; 455/456.5
(58) Field of Classification Search ............. 455/456, 455/457, 456.1, 456.5, 456.6, 414.2, 433, 455/440, 521, 67.11, 456.2, 456.3, 18
   See application file for complete search history.

(56) References Cited

U.S. PATENT DOCUMENTS

| 5,872,774 | A |   | 2/1999 | Wheatley, III et al. |
| 5,890,068 | A |   | 3/1999 | Fattouche et al. |
| 5,970,413 | A | * | 10/1999 | Gilhousen ................. 455/456.3 |
| 6,081,229 | A | * | 6/2000 | Soliman et al. ......... 342/357.05 |
| 6,166,685 | A | * | 12/2000 | Soliman .................. 342/357.1 |
| 6,252,543 | B1 |   | 6/2001 | Camp |

FOREIGN PATENT DOCUMENTS

| WO | WO 99/47943 | * | 9/1999 |
| WO | 0021233 |   | 4/2000 |
| WO | 0120818 |   | 3/2001 |
| WO | 0155803 |   | 8/2001 |
| WO | 0223215 |   | 3/2002 |

* cited by examiner

*Primary Examiner*—Rexford Barnie
(74) *Attorney, Agent, or Firm*—Philip Wadsworth; Bruce W. Greerhaus; Andrea Mays (57) ABSTRACT

Base stations in a wireless telecommunications network are calibrated to GPS system time by using position measurement data obtained from one or more hybrid mobile stations during regular position location sessions. Therefore, the calibration data need not be obtained externally from a calibration instrument, and the calibration may occur on a continuous basis to compensate for any disturbances or drift in the base stations. Privacy concerns are alleviated by using regular position location sessions that occur only when the operator of the hybrid mobile station places or answers a wireless telephone call. In a preferred implementation, the network uses Code Division Multiple Access (CDMA), and the hybrid mobile stations may provide Advanced Forward Link Trilateration (AFLT) or GPS position location data to the network.

20 Claims, 8 Drawing Sheets

BASE STATION TIME CALIBRATION USING POSITION MEASUREMENT DATA SENT BY MOBILE STATIONS DURING REGULAR POSITION LOCATION SESSIONS

The present application claims priority to U.S. Provisional Application No. 60/335,080, filed Oct. 29, 2001.

BACKGROUND OF THE INVENTION

1. Field of the Invention

This invention relates generally to mobile communications and more particularly to the determination of the positions of mobile stations in a mobile communications network. This invention relates specifically to the calibration of base station time in order to maintain accuracy in the determination of the positions of the mobile stations.

2. Description of the Related Art

Mobile communications networks are in the process of offering increasingly sophisticated capabilities for locating the position of a mobile terminal of the network. The regulatory requirements of a jurisdiction may require a network operator to report the location of a mobile terminal when the mobile terminal places a call to an emergency service, such as a 911 call in the United States. In a Code Division Multiple Access (CDMA) digital cellular network, the position location capability can be provided by Advanced Forward Link Trilateration (AFLT), a technique that computes the location of the mobile station (MS) from the mobile station's measured time of arrival of radio signals from the base stations. A more advanced technique is hybrid position location, where the mobile station employs a Global Positioning System (GPS) receiver and the position is computed based on both AFLT and GPS measurements. A further application of the hybrid technique is when time obtained from a GPS-synchronous cellular network is used in obtaining the GPS measurements and computing the mobile station's position.

The accuracy of the location determined by either the AFLT or hybrid technique depends in part upon the precision of the time base in each base station transmitter. For example, the IS-95A (CDMA) standard, published by the Telecommunications Industry Association (TIA) of Arlington, Va., allows up to a 10 microsecond uncertainty in the time of transmission from the base stations to the mobile stations. IS-95A section 7.1.5.2 subtitled "Base Station Transmission Time" says: "All base stations should radiate the pilot PN sequence within ±3 $\mu$s of CDMA System Time and shall radiate the pilot PN sequence within ±10 $\mu$s of CDMA System Time. All CDMA Channels radiated by a base station shall be within ±1 $\mu$s of each other." Because the wireless signal propagates at the speed of light, approximately $3 \times 10^8$ meters per second, a 10 microsecond offset in transmission time, translates to 3 kilometers in ranging error.

In order to maintain time synchronization between the base stations, the base stations can be synchronized to each other or synchronized to a common time base. For example, the Global Positioning System (GPS) is used as a common time base, and each base station may include a GPS receiver. The GPS system includes a constellation of 24 satellites (plus spares) in orbit 11,000 nautical miles above the earth. Each satellite has an atomic clock and transmits a carrier signal modulated by a pseudorandom code and a navigation message modulated at 50 bits per second. The navigation message transmitted by each satellite contains GPS system time, clock correction parameters, ionospheric delay model parameters, the satellite's ephemeris and health, and also almanac and health data for the other satellites. The GPS signals from four or more satellites can be used to compute the GPS system time and the GPS receiver's geographic location.

Although the GPS system can provide a stable time base for the CDMA system, the reference point for GPS system time is the GPS antenna at each base station, and the reference point for the CDMA system time is the CDMA antenna at each base station. Each base station can have a respective time offset between the GPS system time and the transmission of CDMA signals due to variations in propagation delay or phase shift from the GPS antenna to the GPS receiver, from the GPS receiver to the CDMA transmitter, and from the CDMA transmitter to the CDMA antenna. Therefore, to reduce ranging error in AFLT position determinations and to reduce timing and ranging error in hybrid position determinations, every base station has to be individually calibrated with special test equipment after the base station installation is complete. The result of this calibration process is a time offset for each base station pilot. The time offsets are stored in a data base accessible during the computation of position of the mobile stations. Any subsequent hardware change necessitates re-calibration of the base station and updating of the data base. All this represents a costly process.

There are other methods for synchronizing base stations to each other, based on combining the Pilot Signal Strength Message (PSMM) messages sent by mobile stations in soft handoff with round trip delay (RTD) measurements made by the base stations in the active set. With this method, the base stations can be made synchronous with each other; however, it is difficult to maintain overall synchronicity with GPS time across the network of base stations.

Currently, GPS receivers are being incorporated into mobile terminals in order to increase the accuracy of mobile terminal location determination. The GPS receivers can be autonomous and perform all GPS acquisition functions and position calculations, or they can be non-autonomous (also known as wireless assisted) and rely on the cellular network for providing GPS acquisition data and possibly performing the position calculations. By receiving GPS aiding data from the network, a mobile terminal with GPS capability can obtain the time and position data from the GPS satellites in about 10 seconds or less, during a typical phone call. Many, if not most, CDMA wireless phones having GPS capability are expected to be wireless assisted GPS receivers having hybrid capability of providing both GPS and AFLT position information upon the request of a serving base station handling a call from the wireless phone. The position location session can be MS-assisted or MS-based, depending on where the position computation takes place. In the MS-assisted case, the mobile station sends back raw or pre-processed measurement data to the base station. A network entity then computes the location. In the MS-based case, the position computation is performed in the mobile station.

Message protocols and formats for CDMA position location employing AFLT, GPS, and hybrid receivers, applicable to both the MS-based and MS-assisted cases, have been published in TIA/EIA standard IS-801-1 2001, Position Determination Service Standard for Dual-Mode Spread Spectrum Systems—Addendum, incorporated herein by reference. Page 4-43 of this standard specifies that each base station shall transmit a GPS reference time correction of the base station antenna transmitting the CDMA pilot pseudorandom (PN) sequence.

Another position location technique is where the measurements are made by a network entity, rather than by the mobile station. An example of these network-based methods is the RTD measurement carried out by the serving base stations. Measurements made by the mobile station may be combined with network-based measurements to enhance the availability and accuracy of the computed position.

BRIEF SUMMARY OF THE INVENTION

In order to calibrate base stations in a wireless telecommunications network to Global Positioning System (GPS) time, base station timing offsets are computed from position measurement data obtained from one or more hybrid mobile stations during regular position location sessions. The position measurement data includes GPS measurements and data related to the propagation delay for signals transmitted between the base stations and the hybrid mobile stations. For example, the network is a Code Division Multiple Access (CDMA) wireless telecommunications network, and the position measurement data includes GPS measurement data and possibly Advanced Forward Link Trilateration (AFLT) measurement data.

In a preferred implementation, the base station calibration is performed on a substantially continuous basis to compensate for any disturbances in the base stations. The collection of the position measurement data from the hybrid mobile stations occurs only when the hybrid mobile stations carry out regular position location sessions, and the base stations provide GPS acquisition data to the hybrid mobile stations.

DETAILED DESCRIPTION OF THE INVENTION

Other objects and advantages of the invention will become apparent upon reading the following detailed description with reference to the accompanying drawings, in which.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DETAILED DESCRIPTION OF THE INVENTION

Figure 1:
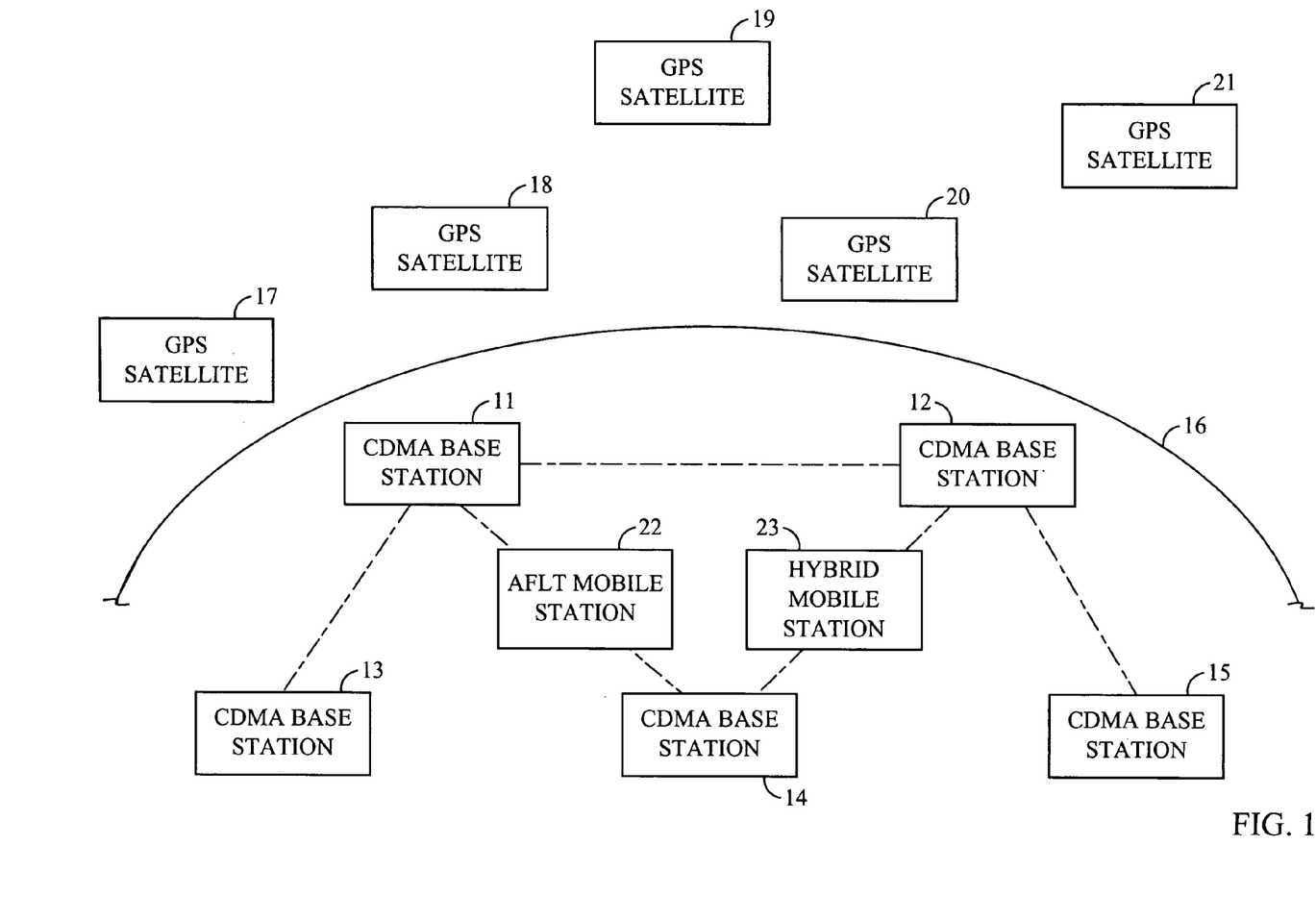
FIG. 1 shows a cellular telephone network using the GPS system for locating mobile telephone units and calibrating base stations in accordance with the present invention.

FIG. 1 shows a CDMA cellular telephone network using a GPS system for locating mobile telephone units and calibrating base stations in accordance with the present invention. FIG. 1 also shows five CDMA base stations 11, 12, 13, 14, 15 laid out in fixed positions in a hexagonal array on the surface of the earth 16. At about 11,000 nautical miles above the earth, there are at least five GPS satellites 17, 18, 19, 20, 21 in line-of-sight communication with the base stations 11 to 15. Within telecommunications range of the base stations, there are a number of mobile CDMA telephone units 22, 23, which are referred to as mobile stations (MS) in the TIA standards documents cited above. These mobile stations (MS) include AFLT only mobile stations, such as the AFLT mobile station 22, and hybrid mobile stations, such as the hybrid mobile station 23.

The CDMA network is capable of locating the position of the AFLT mobile station 22 and the hybrid mobile station 23 using the well-know AFLT technique of the mobile station measuring the time of arrival of so-called pilot radio signals from the base stations. The time of arrival is indicated by a pilot phase measurement that is relative to the mobile station's time base. Differences of the pilot phase measurements from respective pairs of neighboring base stations are computed in order to eliminate the effect of any time offset in the mobile station's time base. In most cases, each difference locates the mobile station on a particular hyperbola. The intersection of the hyperbolas provides the location of the mobile station.

The CDMA network is also capable of locating the position of the hybrid station 23 using the well-known GPS technique. Each CDMA base station 11 to 15 has a GPS receiver receiving the carrier and pseudorandom code sequence of at least one of the GPS satellites 17 to 21 to provide a CDMA system time base referenced to the GPS system time base. When a hybrid mobile station participates in a position location session with the CDMA network, the serving base station may send GPS acquisition data to the hybrid mobile station. The hybrid mobile station 23 may use the GPS acquisition data to obtain, in about ten seconds or less, a measurement of the pseudorange between each GPS satellite 17 to 21 and the mobile station. In the case of an MS-assisted solution, the hybrid mobile station 23 transmits the pseudorange measurements to the serving base station. As further described below with reference to FIG. 3, a position determining entity (PDE) may compute the geographic location of the hybrid mobile station 23 from four or more of the pseudorange measurements. Alternatively, in the case of an MS-based solution, the geographic location of the mobile station may be calculated by the mobile station itself.

Figure 2:
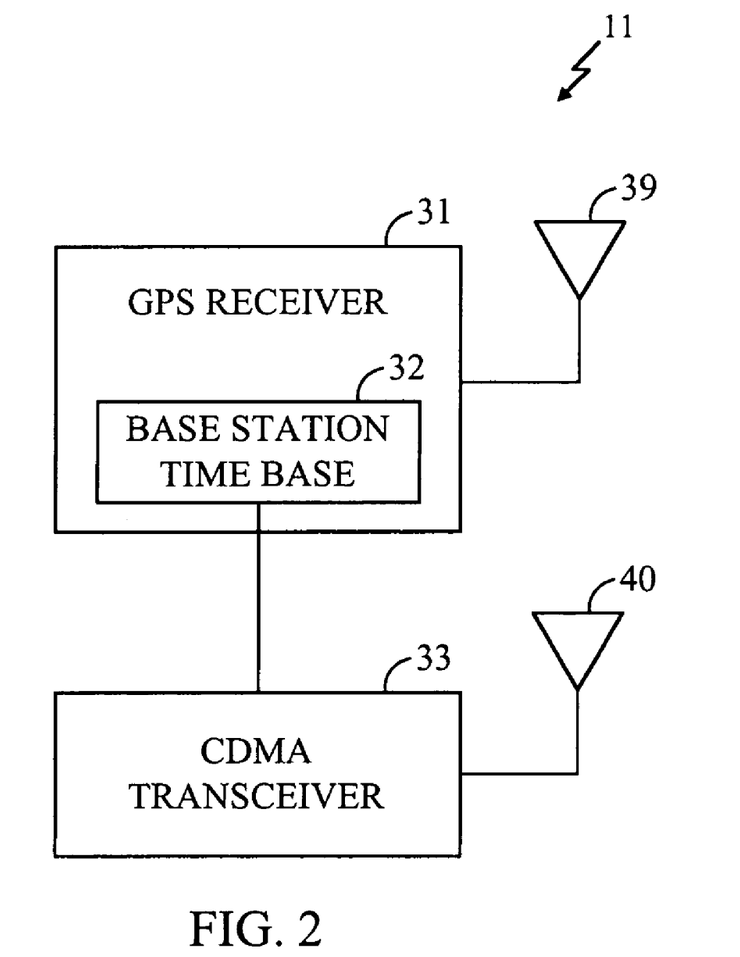
FIG. 2 is a block diagram of a base station in the cellular telephone network of FIG. 1.

FIG. 2 shows the functional blocks in each base station in the cellular telephone network of FIG. 1. Base station 11 includes a GPS receiver 31 providing a base station time base 32 referenced to GPS system time. The GPS receiver 31 obtains signals from a GPS antenna 39. The base station also includes a CDMA transceiver 33 for communicating with mobile stations in the CDMA network. The CDMA transceiver 33 obtains CDMA system time from the base station time base 32. The CDMA transceiver 33 sends and receives wireless signals through a CDMA antenna 40.

Figure 3:
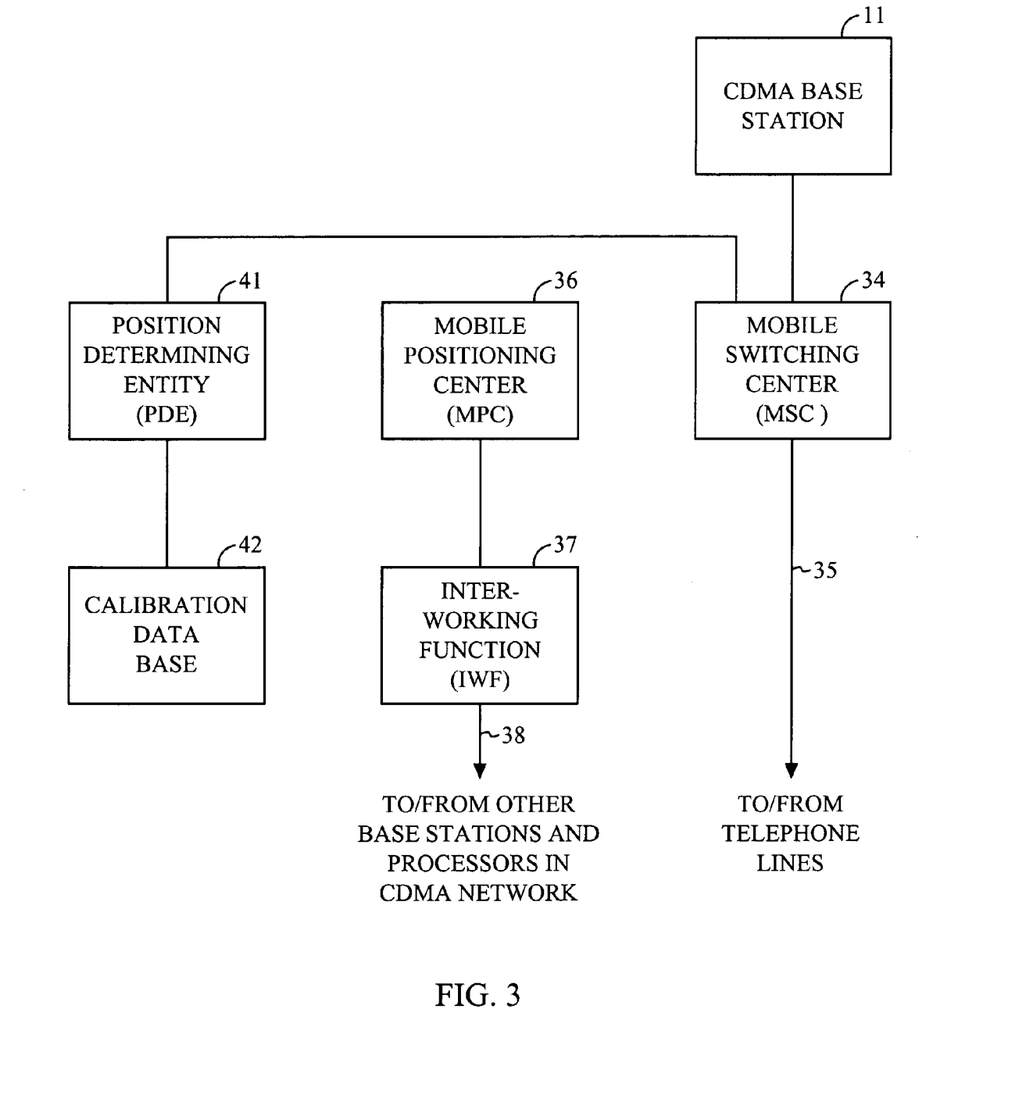
FIG. 3 is a block diagram of stationary components of the cellular telephone network of FIG. 1, including a position determining entity.

FIG. 3 is a block diagram of stationary components of the cellular telephone network of FIG. 1. A mobile switching center (MSC) 34 interfaces voice signals and telecommunication data between base station 11 and a number of telephone lines 35, such as copper wires or optical fibers. A mobile positioning center (MPC) 36 is connected to mobile switching center 34. The MPC 36 manages position location applications and interfaces location data to external data networks through an interworking function (IWF) 37 and a data network link 38. A position determining entity (PDE) 41 collects and formats position location data. The PDE 41 provides wireless assistance to mobile stations and it may perform position computations. The PDE 41 is connected to the MPC 36 and the MSC 34. The PDE 41 manages a calibration data base 42. The PDE 41 and the calibration data base 42 are implemented, for example, using a conventional digital computer or work station. In effect, the processor of the computer executes a program, as flowcharted in FIGS. 4 to 8 below, to function as the PDE 41. The calibration data base 42 is stored in the hard disk or in the memory of the digital computer or work station.

As introduced above, there is a problem with calibrating the base station time base (32 in FIG. 2) when the base station is installed or modified. Each base station can have a respective time offset between the GPS system time and the transmission of CDMA signals due to variations in propagation delay or phase shift from the GPS antenna (39 in FIG. 2) to the GPS receiver (31 in FIG. 2), from the GPS receiver to the CDMA transceiver (33 in FIG. 2), and from the CDMA transceiver to the CDMA antenna (40 in FIG. 2). Therefore, to reduce ranging errors in AFLT position determinations and ranging and timing errors in hybrid position determinations, every base station should be calibrated after the base station installation is complete, for example, by storing a time offset for the base station in the calibration data base (42 in FIG. 3) for use by the position determining entity (PDE 41 in FIG. 3). Moreover, it is desirable to re-calibrate the base station and update the data base for any subsequent hardware change.

As disclosed herein, this problem is solved by calibrating the base station 11, 12, 13, 14, 15 using position measurement data obtained from one or more hybrid mobile stations 23 during regular position location sessions. Therefore, the calibration data need not be obtained externally from a calibration instrument. Instead, the PDE (41 in FIG. 3) may compute the calibration data internally and store the calibration data in the calibration data base (42 in FIG. 3) on a continuous basis. In addition, to alleviate any privacy concerns, the regular position location sessions may occur only when the operator of the hybrid mobile station places or answers a wireless telephone call. In this case, the CDMA system does not determine the operator's position without the operator's knowledge and consent.

FIGS. 4 to 7 together comprise a flowchart of a procedure executed when a hybrid mobile station in the CDMA system carries out a position location session. Shown in this flowchart are the operations for calibration of the serving base station. In a first step 51, the calibration operations end if a hybrid mobile station is not in the process of carrying out a position location session. Otherwise, execution continues at step 52.

Figure 4:
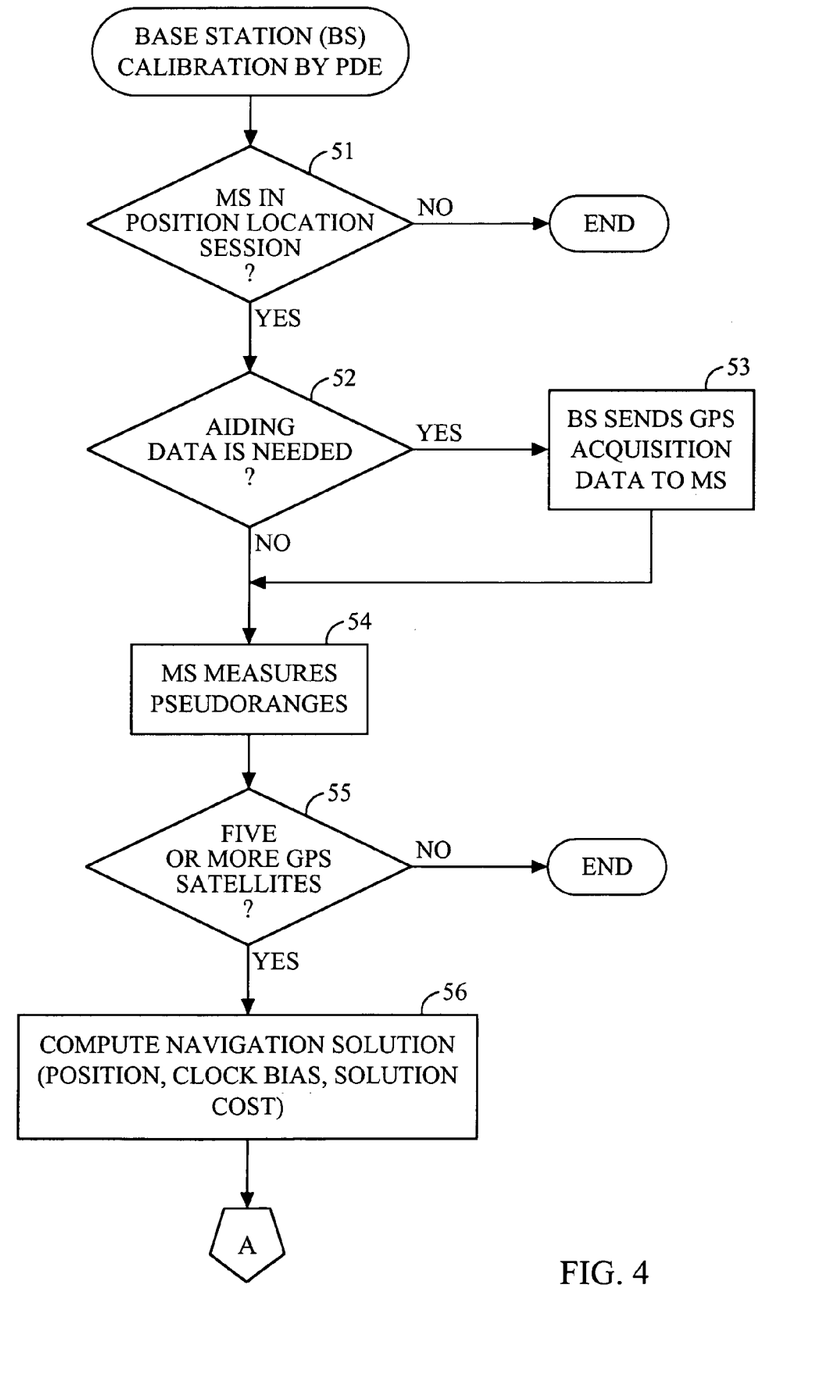
FIGS. 4 to 7 together comprise a flowchart of a procedure executed by the position determining entity for calibrating the time base of a base station using a mobile station having a hybrid (GPS and AFLT) position determining capability.

In step 52, the PDE (41 in FIG. 3) determines if aiding data needs to be sent to the mobile station. If aiding is needed, then in step 53, the serving base station sends aiding data to the hybrid mobile station, and the execution continues at step 54. Otherwise, the execution directly continues at step 54. In step 54, the hybrid mobile station acquires GPS code phase (i.e., pseudorange) measurements from at least five GPS satellites that should provide the best signals for determining the position of the hybrid mobile station. In hybrid mobile station 23, the code phase measurements should be taken relative to the pilot phase received from the serving base station. Referencing the GPS code phase to the serving pilot phase may be done directly or indirectly. An example for the latter is when both the GPS code phase and the CDMA pilot phase is expressed with reference to MS system time, as specified in IS-801-1. In step 55, if the hybrid mobile station has not obtained pseudorange measurements of sufficient quality for five or more GPS satellites, then the procedure is finished. (Note that a regular position location session without the base station calibration functionality may still proceed.) The quality of the pseudorange measurements may be ascertained based on the received signal-to-noise ratio and possibly based on observing the shape of the correlation peak (a wide peak may indicate multipath error) or other factors. Otherwise, execution continues at step 56.

In step 56, the entity that carries out the position location computation receives pseudorange measurements from the hybrid mobile station for each of the measured GPS satellites, and computes the mobile's position using well-known navigation solution techniques. In the case of the MS-assisted method, this entity may be the PDE (41 in FIG. 3), while in the case of the MS-based method, this entity is the mobile station itself. The navigation solution provides, as a result, a mobile position estimate, an average pseudorange bias (i.e., mobile station clock bias) and the position solution cost (i.e., the average of the squares of the residual pseudorange errors). In the MS-based case, both the position estimate and the mobile station clock bias are returned from the MS to the PDE. Since at least five measurements were used in the navigation solution, the solution cost is a good indicator of GPS measurement integrity. Therefore, in step 57 of FIG. 5, if the solution cost is greater than a predetermined maximum (CMAX), then the calibration procedure is finished. Otherwise, execution continues at step 58. When the solution cost is not available, (for example, in an MS-based implementation that would not return it to the PDE) then step 57 may be omitted. In this and all other cases, the solution cost thresholding of step 57 may be substituted or augmented by a thresholding based on a measurement standard deviation estimate. The standard deviation estimate may be based on measured signal characteristics (such as signal-to-noise ratio) or on statistical characteristics derived from a collection of measurements in the case of multiple fixes.

Figure 5:
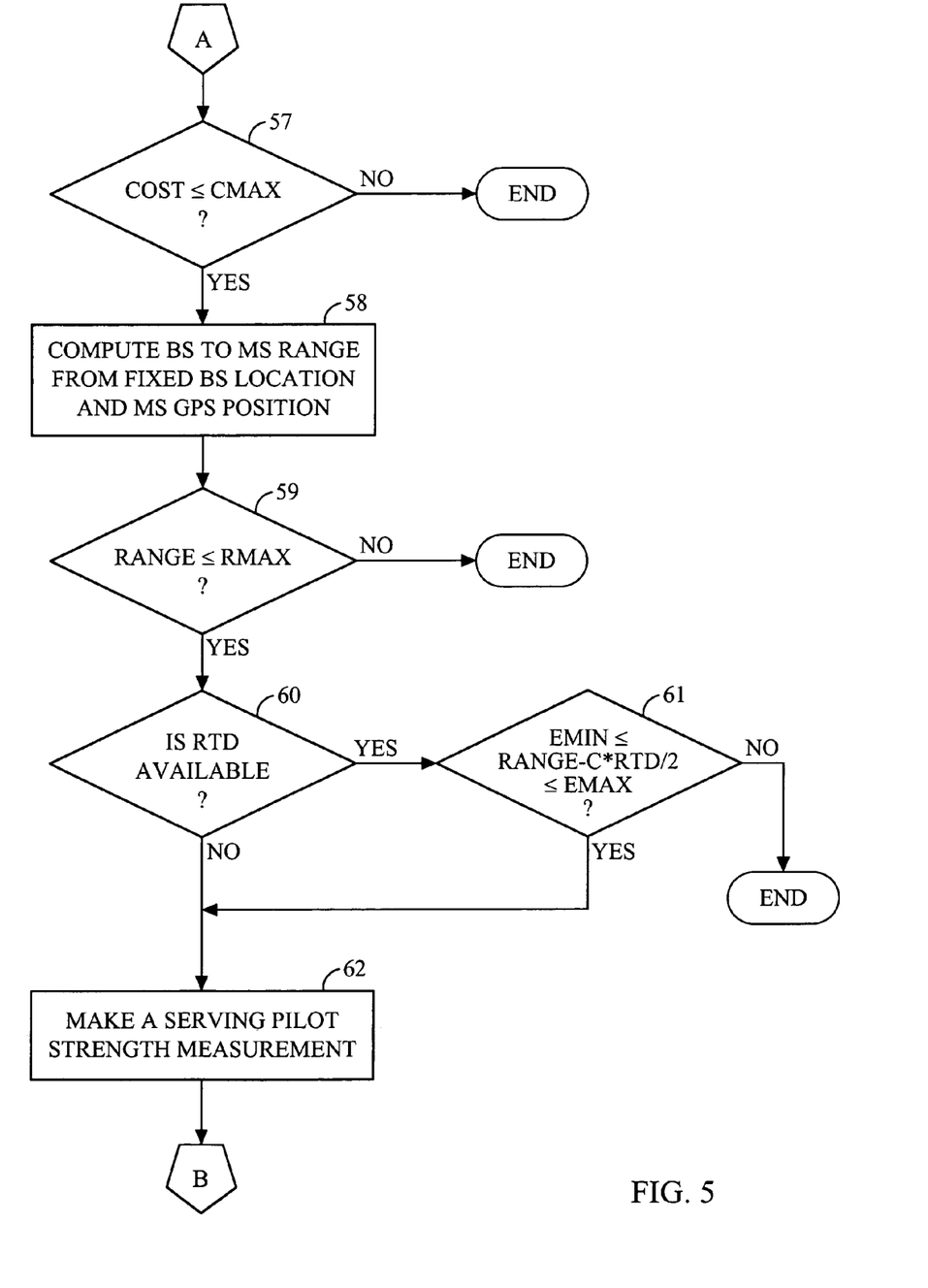

In step 58 of FIG. 5, the PDE computes the BS to MS range from the known fixed location of the serving base station and the GPS position computed in step 56. It is useful to apply range thresholding in order to maximize the probability of line-of-sight signals between the serving base station and the MS, thus minimizing the likelihood of serving pilot multipath affecting the mobile station's system clock. Therefore, in step 59, if the range is greater than a predetermined maximum range (RMAX), then the calibration procedure is finished. Otherwise, execution continues at step 60. In step 60, the availability of RTD measurements is tested. If no RTD measurement (typically provided by the serving base station and corrected by the mobile station receive-to-transmit timing offset reported by the mobile station) is available, then the execution continues at step 62. Otherwise, the execution continues at step 61. In step 61, the BS to MS range computed in step 58 is compared with the value of c*RTD/2, where c is the speed of light. If the difference is bigger than a predetermined maximum value (EMAX), or less than a predetermine minimum value (EMIN), then the calibration procedure is finished. (Note that the observed difference between the BS to MS range and c*RTD/2 can be used as a multipath correction term in the calibration computation, when the RTD measurement is known to be reliable.) Otherwise the execution continues at step 62.

Figure 6:
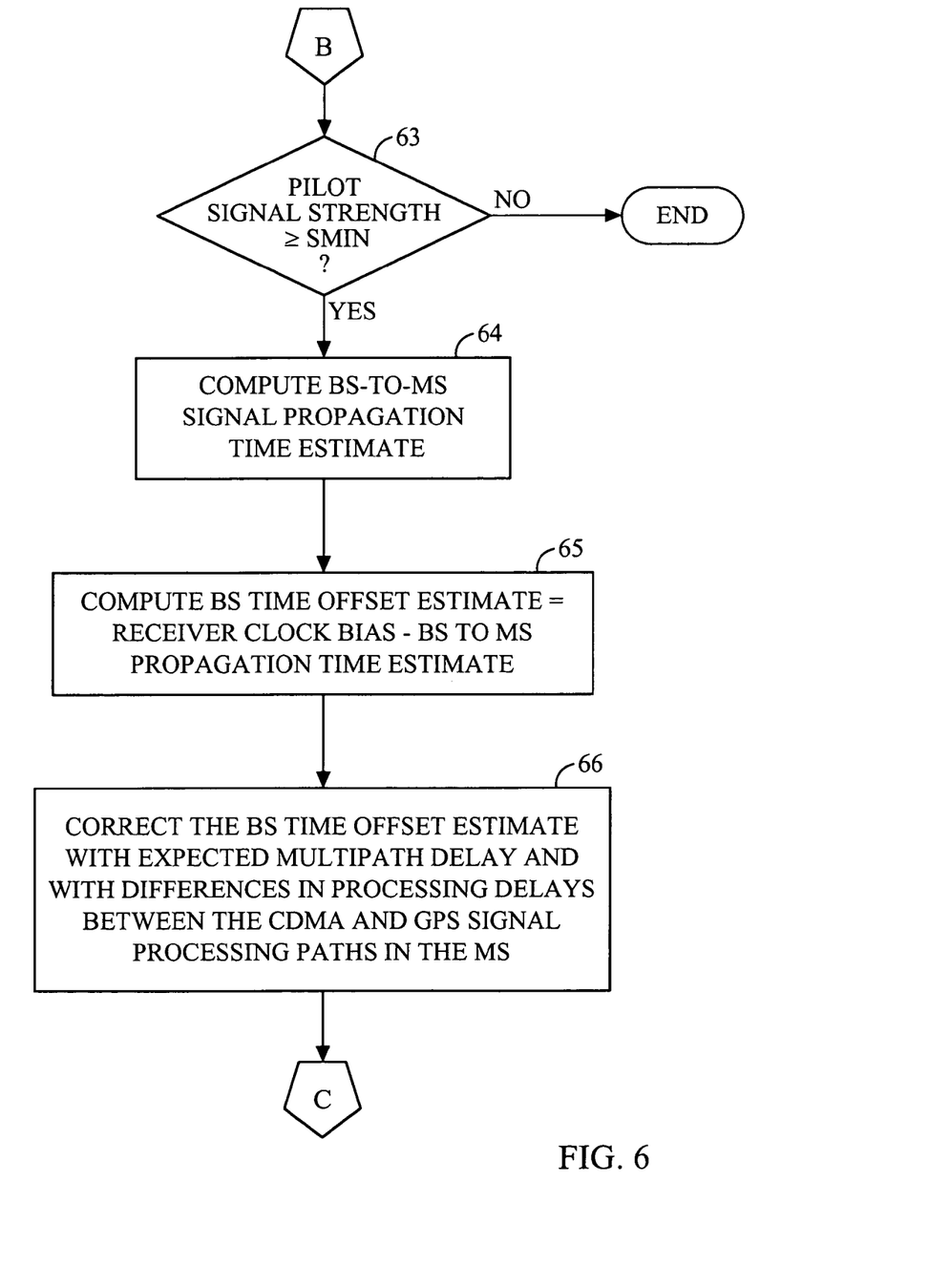

In step 62, a serving pilot signal strength measurement is taken by the hybrid mobile station. Note that the pilot strength measurement may be taken at an earlier stage of the process, with the results being stored. In step 63, if the pilot signal strength is not greater or equal to a predetermined minimum signal strength (SMIN), then the calibration procedure is finished. Otherwise, execution continues at step 64.

In step 64, a serving base station to mobile station propagation time estimate is computed. The propagation time estimate may be based on the serving base station to mobile station distance computed in step 58, or the RTD value used in step 61, or a combination thereof (e.g. weighted average).

In step 65, a serving base station time offset estimate is computed. The time offset is estimated as the difference between the mobile station clock bias computed in step 56, and the serving base station to mobile station propagation delay computed in step 64. (Alternatively, the serving base station time offset can be directly estimated based on the pseudorange measurements, described as follows. Knowing the GPS ephemeris, i.e., the satellite's position in space, the theoretical GPS code phases observable by the hybrid mobile station can be calculated, and the difference between the returned pseudorange measurement and the theoretical code phase is the pseudorange bias. If the pseudorange bias is corrected by the serving base station to mobile station propagation delay estimate computed in step 64, then the result will be the base station time offset estimate. The base station time offset estimate can be improved by averaging the pseudorange bias over a number of satellites.) The execution then continues at step 66.

In step 66, the serving base station time offset estimate obtained in step 65 is refined by applying various correction terms. The time offset estimate error caused by residual CDMA multipath effects may be estimated and corrected for based on the known local signal propagation environment. For example, if it is known that at the location determined in step 56, a certain amount of multipath excess delay is expected, then that expected delay might be applied as a correction term. The base station time offset estimate error due to internal asymmetries between the CDMA and GPS processing in the hybrid mobile station, may be compensated for if calibration data for the particular type of mobile station is available. This may necessitate transferring information about the particular mobile station, such as the Electronic Serial Number of the mobile station, to the PDE. Alternatively, correcting for the internal asymmetries between the CDMA and GPS processing in the hybrid mobile station may be omitted, in which case the mobile station time offset will be part of the base station calibration. This doesn't affect the positioning accuracy in any way, as long as the internal asymmetries between the CDMA and GPS processing in the hybrid mobile station are not compensated for elsewhere.

Based on collected statistics, an average lower bound on the corrected base station time offset estimate computed in step 66 will represent the base station time calibration. Higher base station time offset estimates can be assumed to have been affected by multipath propagation. Note that the base station time offset estimate error due to multipath is always positive. Thresholding eliminates the effects of the multipath related errors. For example, in step 67 in FIG. 7, a threshold is computed based on collected statistics. In this example, the base station time offset estimate threshold is computed as the mean base station time offset plus two standard deviations. If it is expected that the true base station time offset can change abruptly, then the threshold levels may need to be relaxed, or preferably, more sophisticated statistical methods can be used to determine the thresholds. This is needed in order to enable the calibration process to continue after a jump in base station time offset; otherwise the calibration process could be disabled by deeming all subsequent time offset estimates multipath affected. Such statistical method may be, for example, computing an age weighted probability density function of all collected estimates, with a local bias towards lower values, and choosing the highest peak of the resulting probability density function. In step 68, if the base station time offset estimate is greater than the threshold, then the calibration procedure is finished, because the base station time offset estimate is presumed to contain significant multipath error. Otherwise, execution continues from step 68 to step 69. The thresholding of step 68 may be omitted if the multipath-free nature of the received serving pilot signal can be ascertained by other means.

Figure 7:
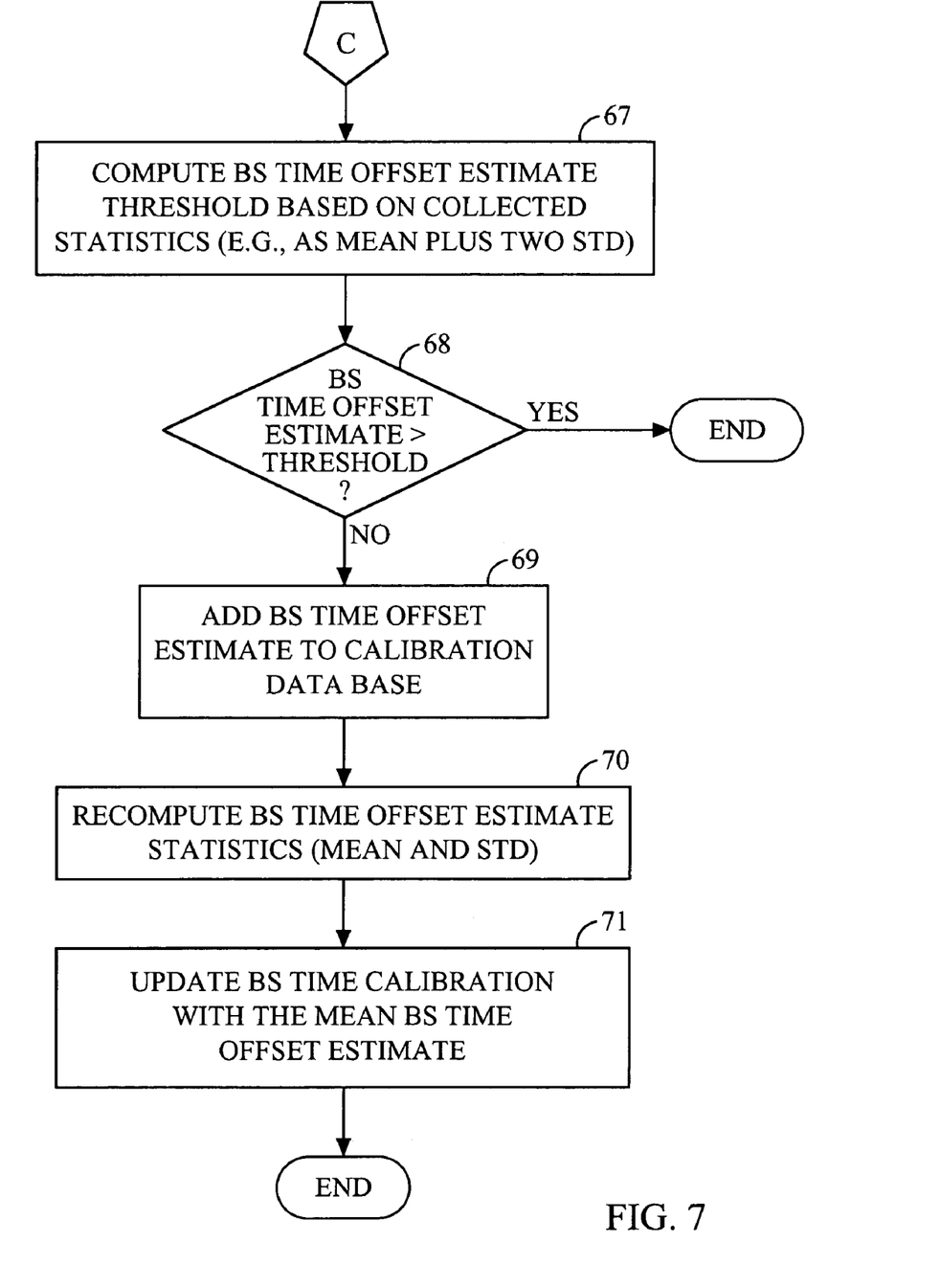

In step 69, the base station time offset estimate is entered in the calibration data base. In step 70, the base station time offset estimate statistics, such as the mean and standard deviation, are recomputed based on the base station time offset estimate added to the calibration data base in the previous step 69. When there is not enough data to compute statistics, for example at the beginning of the first calibration process, a predetermined mean and a (sufficiently large) standard deviation may be assumed in the initialization. In step 71, the timing offset of the serving base station as stored in the serving base station is updated with the new value of the mean base station time offset estimate computed in the previous step 70.

Figure 8:
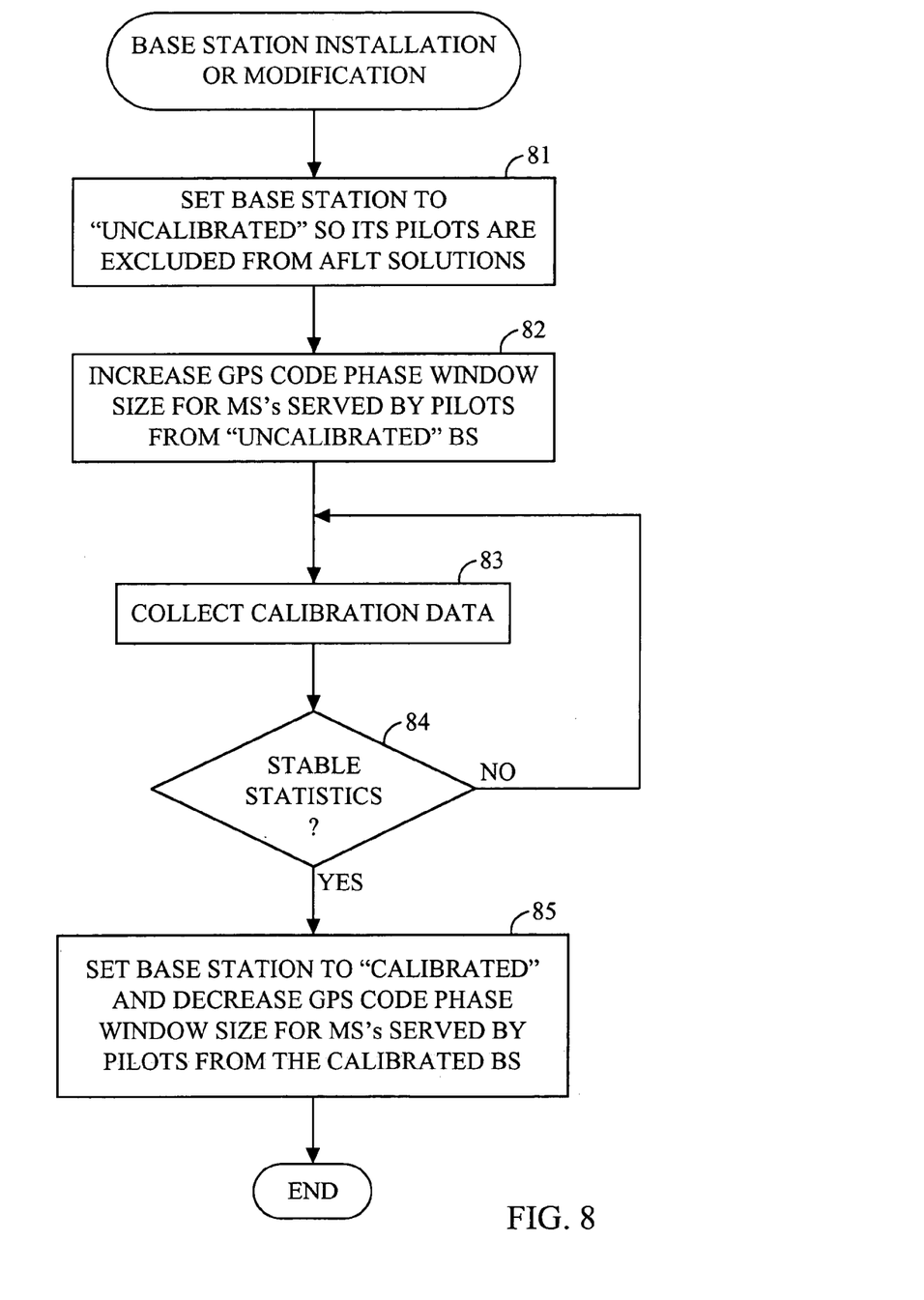
FIG. 8 is a flowchart of a procedure executed by the position determining entity for management of the calibration of a base station after the base station is installed or modified.

FIG. 8 is a flowchart of a procedure executed by the position determining entity for management of the calibration of a base station after the base station is installed or modified. When a base station is known to be non-calibrated, i.e., at initial deployment or upon observing timing instability, then the PDE can temporarily exclude the corresponding pilots from AFLT solutions. Therefore, in step 81, a base station attribute in the calibration data base is set to "uncalibrated," and this attribute is tested by the PDE to temporarily exclude the corresponding pilots from AFLT solutions. In step 82, the PDE also tests this attribute to increase the GPS code phase window size for mobiles served by these pilots. After collecting calibration data in step 83 and ensuring that the statistics have stabilized in step 84, the PDE re-enables the AFLT and hybrid solutions in step 85. For example, in step 84, the average base station time offset estimate for the base station for the last ten consecutive base station time offset estimate values entered into the calibration data base is compared to the average base station time offset estimate values entered into the calibration data base for the previous ten consecutive base station time offset estimate values entered into the calibration data base, and if the averages differ by no more than a certain percentage, such as five percent, then the statistics of the base station time offset estimate are considered to be stable.

In view of the above, there has been described a method of calibrating the base stations in a wireless telecommunications network to GPS system time using position measurement data obtained from one or more hybrid mobile stations during regular position location sessions. Therefore, the calibration data need not be obtained externally from a calibration instrument, and the calibration may occur on a continuous basis to compensate for any disturbances in the base stations. Privacy concerns are alleviated by using regular position location sessions that occur only when the operator of the hybrid mobile station initiates or allows the position location service.

What is claimed is:

1. A method of calibrating base stations in a wireless telecommunications network to Global Positioning System (GPS) time, said method comprising:
   computing base station timing offsets from position measurement data obtained from one or more hybrid mobile stations during regular position location sessions, wherein position measurement data includes GPS pseudorange measurement data and position measurement data based on propagation delay for signals transmitted between the hybrid mobile stations and the base stations;
   storing the base station timing offset in a calibration database responsive to the step of computing;
   determining base station timing offset statistics responsive to the step of storing; and
   updating a base station's timing offset responsive to the step of determining.

2. The method as claimed in claim 1, wherein calibration data for calibrating the base stations to GPS time is not obtained externally from any calibration instrument for input into the wireless telecommunications network.

3. The method as claimed in claim 1, which includes performing the base station calibration on a substantially continuous basis to compensate for any disturbances in the base stations.

4. The method as claimed in claim 1, wherein collection of the position measurement data from the hybrid mobile stations occurs only when the hybrid mobile stations place or answer wireless telephone calls.

5. The method as claimed in claim 1, wherein the base stations provide GPS acquisition data to the hybrid mobile stations.

6. The method as claimed in claim 1, which includes excluding position measurement data based on propagation delay for signals transmitted between the hybrid mobile stations and the base stations when there is a substantial likelihood of significant propagation delay caused by multipath propagation.

7. The method as claimed in claim 1, which includes excluding position measurement data based on propagation delay for signals transmitted between at least one of the hybrid mobile stations and at least one of the base stations when distance between said at least one of the base stations and said at least one of the hybrid mobile stations exceeds a certain distance.

8. The method as claimed in claim 1, which includes excluding position measurement data based on propagation delay for signals transmitted between at least one of the mobile stations and at least one of the base stations when strength of the signals transmitted between said at least one of the mobile stations and said at least one of the base stations is less than a certain signal strength.

9. The method as claimed in claim 1, which includes excluding a GPS position determination of at least one of the hybrid mobile stations when redundant GPS position fixes cannot be computed from pseudorange measurements from at least five GPS satellites.

10. The method as claimed in claim 1, which includes excluding a GPS position determination of at least one of the hybrid mobile stations when there is more than a certain deviation between redundant position fixes from at least five GPS satellites.

11. The method as claimed in claim 1, which includes collecting statistics of base station timing offset, and based on the collected statistics, computing an averaged lower bound on computed base station timing offset in order to reject base station timing measurements related to multipath error.

12. The method as claimed in claim 11, which includes rejecting a base station timing offset measurement that is more than a certain number of standard deviations greater than a mean base station timing offset.

13. The method as claimed in claim 1, which includes installing or modifying at least one of the base stations, and excluding use of signals from said at least one of the base stations for position determination of mobile stations in the telecommunications network until said at least one of the base stations has been calibrated by using position measurement data obtained from one or more hybrid mobile stations during regular position location sessions.

14. The method as claimed in claim 13, which includes determining that said at least one of the base stations has been calibrated when the calibration data is observed to have stable statistics.

15. A method of calibrating base stations in a Code Division Multiple Access (CDMA) wireless telecommunications network to Global Positioning System (GPS) time, said method comprising:
   computing base station timing offsets from position measurement data obtained from one or more hybrid mobile stations during regular position location sessions, wherein the position measurement data includes GPS pseudorange measurement data and Advanced Forward Link Trilateration (AFLT) position measurement data;
   storing the base station timing offsets in a calibration database responsive to the step of computing;
   determining base station timing offset statistics responsive to the step of storing; and
   updating a base station's timing offset responsive to the step of determining.

16. The method as claimed in claim 15, which includes performing the base station calibration on a substantially continuous basis to compensate for any disturbances or drift in the base stations.

17. The method as claimed in claim 15, wherein the collection of the position measurement data from the hybrid mobile stations occurs only when the hybrid mobile stations place or answer wireless telephone calls.

18. The method as claimed in claim 15, wherein the base stations provide GPS acquisition data to the hybrid mobile stations.

19. The method as claimed in claim 15, which includes installing or modifying at least one of the base stations, and excluding use of pilot signals from said at least one of the base stations for AFLT position determination of mobile stations in the telecommunications network until said at least one of the base stations has been calibrated by using position measurement data obtained from one or more hybrid mobile stations during regular position location sessions.

20. A method of calibrating base stations in a Code Division Multiple Access (CDMA) wireless telecommunications network to Global Position System (GPS) time, said System (GPS) time, said method comprising:
   computing base station timing offsets from position measurement data obtained from one or more hybrid mobile stations during regular position location sessions, wherein the position measurement data includes GPS pseudorange measurement data and Advanced Forward Link Trilateration (AFLT) position measurement data;

storing the base station timing offsets in a calibration database responsive to the step of computing;

determining base station timing offset statistics responsive to the step of storing; and updating a base station's timing offset responsive to the step of determining, wherein the station calibration is performed on a substantially continuous basis to compensate for any disturbances in the base stations, wherein the collection of the position measurement data from the hybrid mobile stations occurs only when the hybrid mobile stations place or answer wireless telephone calls, and wherein the base stations provide GPS acquisition data to the hybrid mobile stations.

* * * * *